US00RE40776E

(19) United States
(12) Reissued Patent
Delattre et al.

(10) Patent Number: US RE40,776 E
(45) Date of Reissued Patent: Jun. 23, 2009

(54) METHOD FOR TRANSLATING AN ATM SWITCH CELL HEADER

(76) Inventors: Michel Delattre, 95, rue de Bellevue, 92100 Boulogne (FR); Didier Guerin, 5 bis, rue St. Michel, 78890 Garancieres (FR); Marc Bavant, 21, rue Clavel, 75019 Paris (FR)

(21) Appl. No.: 11/119,494

(22) PCT Filed: Jun. 12, 1998

(86) PCT No.: PCT/FR98/01239

§ 371 (c)(1),
(2), (4) Date: Feb. 10, 1999

(87) PCT Pub. No.: WO98/57466

PCT Pub. Date: Dec. 17, 1998

Related U.S. Patent Documents

Reissue of:
(64) Patent No.: 6,556,570
Issued: Apr. 29, 2003
Appl. No.: 09/147,667
Filed: Feb. 10, 1999

(30) Foreign Application Priority Data

Jun. 13, 1997 (FR) ..... 97 07355

(51) Int. Cl.
*H04L 12/56* (2006.01)

(52) U.S. Cl. ..... 370/395.31; 370/397; 370/399
(58) Field of Classification Search ..... 370/389, 370/392, 396–399, 395.1, 395.3–395.31, 370/474–475
See application file for complete search history.

(56) References Cited

U.S. PATENT DOCUMENTS 5,414,701 A 5/1995 Shtayer et al.
5,481,687 A * 1/1996 Goubert et al. ..... 711/212
5,546,387 A 8/1996 Larsson et al.
5,555,256 A 9/1996 Calamvokis
5,732,081 A 3/1998 Grenot et al.
5,790,804 A 8/1998 Osborne
5,936,959 A 8/1999 Joffe
6,044,077 A 3/2000 Luijten et al.
6,046,996 A 4/2000 Hoshino et al.
6,262,985 B1 7/2001 Huang et al.
6,327,261 B1 * 12/2001 Makoua et al. ..... 370/392
6,556,570 B1 4/2003 Delattre et al.

FOREIGN PATENT DOCUMENTS

EP 0 552 384 A 7/1993
FR 97 07355 A 6/1997
WO WO 95 34977 A 12/1995
WO WO 96 23391 A 8/1996

* cited by examiner

*Primary Examiner*—Chi Pham
*Assistant Examiner*—Tri H. Phan
(74) *Attorney, Agent, or Firm*—Christensen O'Connor Johnson Kindness PLLC

(57) ABSTRACT

The invention relates to a process for translating an ATM cell header for the routing thereof on a transmission highway of a communication network via an ATM switch. The header of the cell includes a first field VPI and a second field VCI, the first field VPI identifying a virtual path number and the second field VCI selecting a specified virtual channel within the virtual path. The process includes in]storing indirect addressing context page numbers in a first major table (3), storing context page numbers for the circuits in VP switching mode in a second major table (4), storing context page numbers (7) for the circuits in VC switching mode in indirect addressing (5) context pages (2), addressing the context pages (7) of circuits in VC switching mode by way of an indirect addressing (5) context page on the basis of the first major table (3) and of the field VCI, and addressing the context pages (9) of the VP switching mode on the basis of context page numbers contained in the second major table (4).

57 Claims, 3 Drawing Sheets

VPI FIELD
VPI0
VPI1
VPI2
VPI3

MAJOR TABLE
"VC MODE"
INDIRECT ADDRESSING
CONTEXT PAGE
M1
3
6
2
5
M2
VCI FIELD
VCI0
VCI1
VCI4
VCC CONTEXT PAGE
M3
8
7
VPI FIELD
VPI0
VPI1
VPI4
MAJOR TABLE
"VP MODE"
M4
VPC CONTEXT PAGE
M5
10
9
4

METHOD FOR TRANSLATING AN ATM SWITCH CELL HEADER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a process for translating a header of a cell applied to the input of a node of an asynchronous packet data transmission network.

It applies in particular to the digital data switching and cross-connection equipment making up a network operating in the mode of transmission known by the abbreviation ATM standing for "Asynchronous Transfer Mode".

2. Discussion of the Background

The ATM asynchronous transfer mode is mainly defined in the recommendations of the ITU-T (series I), as well as in the work of an industrial grouping dubbed the "ATM Forum".

In the ATM asynchronous transfer mode the information to be transmitted is grouped together in the form of packets. Together, header plus data is dubbed a cell. Basically, ATM operates in a connected mode, that is to say it has to establish a route through the transmission network before being able to transmit the data. This route is termed a "virtual circuit". There are in general numerous virtual circuits which follow the same physical connection between two items of ATM equipment. The main role of the header of the cells is to allow the identification of the virtual circuits over the link. An example of implementing such a process is known in particular from French Patent Application No. 2 681 164 filed in the name of the Applicant.

A virtual circuit is obtained by placing end-to-end virtual communication pathways established between adjacent switches. These pathways are of two types: virtual paths or virtual channels, the virtual channels being regarded as a subdivision of the virtual paths. On a given highway, any virtual circuit is fully determined by indicating the identifier of the virtual path (VPI) and that of the virtual channel (VCI) which it follows, in the case of a circuit to be switched in VC mode (VCC), or else by indicating just the identifier of the virtual path (VPI), in the case of a circuit to be switched in VP mode (VPC).

According to this process, each cell to be routed within a network is composed on the one hand of a header making it possible to identify it and guide it through the pathways making up the virtual circuit, and on the other hand, of a part containing the information to be conveyed. Routing is effected at the level of each node of the network by extracting from the header the address of a word contained in a first context memory containing the information required for identifying the header and for guiding the data to be conveyed and by creating a new address on the basis of the word read from the first context memory. This new address serves as a pointer to an area of a second context memory in which there is at least one new header and one outgoing direction information cue for the cell or cells existing the node.

The translation function which is thus carried out makes it possible for each cell to be associated with the information enabling it to undergo the processing operations for which it is intended. The translator which is responsible for executing this function on each cell which it receives must typically provide information about the validity of the virtual path identifier, the validity of the virtual channel identifier, counting, the list of outgoing directions in which the cell received is transmitted, the new header associated with the cell during its transmission etc. The translator must also execute the processing operations corresponding to the context defined previously for each cell. These processing operations relate in particular to virtual path (VP) switching, virtual channel (VC) switching and the extracting of the maintenance flows.

From the structural standpoint the translation function is carried out with the aid of a memory plane addressed by a microprogrammed processing unit.

However, this very large memory plane, whose size may contain for example $2^{32}$ words of 16 bits, is difficult to manage.

To alleviate this difficulty, the French Patent Application published under No. 2 726 669 filed by the applicant proposed that the memory space of the node be addressed on the basis of the virtual path number VPI contained in the header of the cell so as to identify in this space a first context area indicating the range of the virtual channels which can be used by the cell for this VPI and that a second context area be addressed on the basis of a virtual channel number VCI contained in the header of the cell and of a base address read from the first context area so as to obtain the list of directions which the cell must take on exiting the node, as well as the new header.

However, this process proves to be poorly suited to the constraints imposed by the new virtual interfaces of switches such as for example the "Virtual UNI" interface specified in chapter A7-4 of the ATM Forum's "UNI signalling version 4.0" specification. It does not for example allow a rearrangement of the translation memory when there is a modification in the number of users who, on one and the same physical interface, are sharing the virtual path capacities.

This is manifested through the appearance of gaps in the translation memory which limit the possibilities for utilizing the whole spectrum of possible VPI and VCI values.

The purpose of the invention is to alleviate the above-mentioned drawbacks.

SUMMARY OF THE INVENTION

To this end, the subject of the invention is a process for translating an ATM cell header for the routing thereof on a transmission highway of a communication network via an ATM switch, the header of the cell comprising a first field VPI and a second field VCI, the first field VPI identifying a virtual path number and the second field VCI selecting a specified virtual channel within the virtual path, characterized in that it consists:

in storing indirect addressing context page numbers in a first major table, in storing context page numbers for the circuits in VP switching mode in a second major table, in storing context page numbers for the circuits in VC switching mode indirect addressing context pages, in addressing the context pages of circuits in VC switching mode by way of an indirect addressing context page of the context page numbers on the basis of the first major table and of the second field VCI, and in addressing the context pages of the circuits in VP switching mode on the basis of context page numbers contained in the second major table.

The main advantage of the invention is that it associates the N contexts determined by the available memory size with a number of connection of the same order of magnitude as N, even if the identifiers (VPI, VCI) of its connections describe ranges of values which are multiples from among the $2_{28}$ theoretically possible values. It also allows partial modifications of the configuration of a network consisting for example in modifying a VP switching mode into a VC mode for a specified VPI value or else in activating/deactivating a consequent string of VPI values, without impairing the operational functioning involving the VPI and VCI values for which the modification is not relevant. As another advantage the size of the translation memory is suited to the strict need of a limited number of connections (either VPC or VCC), this number being small relative to the numbers of possible combinations of the VPI/VCI values. On the other hand, the translation operations, especially those giving rise to slow memory accesses, are reduced to a minimum number, thereby making it possible to process ATM flows with high bit rates of for example greater than 155 Mbps. Finally, it allows the installation of a temporary bypass to a built-in test probe in VP switching mode so as to observe the traffic over certain virtual channels VC.

BRIEF DESCRIPTION OF THE DRAWINGS

Other characteristics and advantages of the invention will emerge from the following description which is given with regard to the appended drawings which represent.

DETAILED DESCRIPTION OF THE PREFERRED EMBODIMENTS

Figure 1:
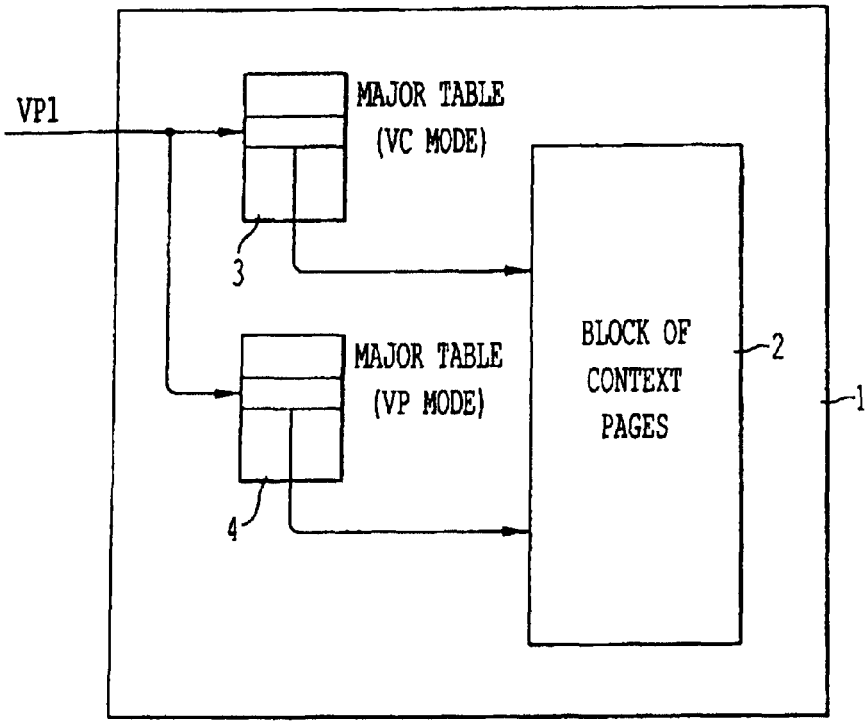
FIG. 1 the organization of a translation memory according to the invention.
Figure 2A:
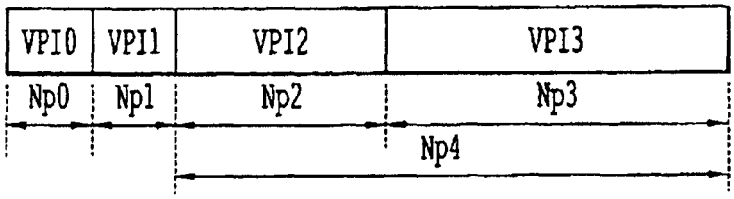
FIGS. 2A and 2B the format of a VPI field of a cell header.
Figure 2B:
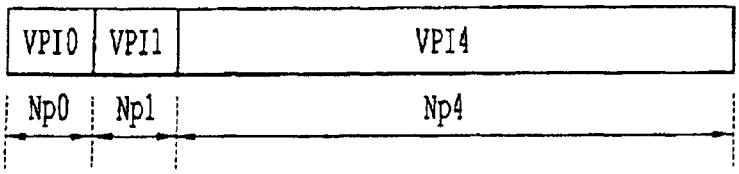
Figure 3:
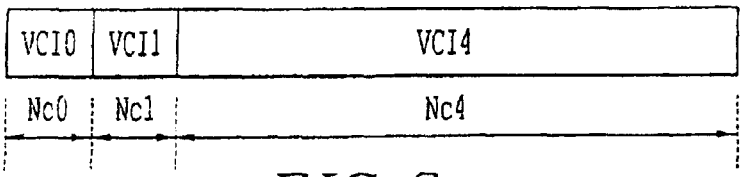
FIG. 3 the format of a VCI field of a cell header.

According to the embodiment of FIG. 1, the translation memory 1 is structured as a block of general-purpose context pages 2, that is to say pages which are used both in respect of the information relating to the circuits in VP mode, in VC mode, or to contain indirect addressing information. All the pages have an identical size. They contain a number of elementary information cues ("contexts") which depends on the type of page concerned. In this embodiment a page can be addressed on the basis of a first 3 or a second 4 major indexing table which respectively store indexation fields relating to the circuits in VC and VP mode. The tables 3 and 4 are addressed by the high-order bits of the field VPI read from the header of each incoming ATM cell in the switch. In VC switching mode the VPI field is formed of the areas VPI0, VPI1, VPI2 and VPI3 represented in FIG. 2A and in VP switching mode, the VPI field is formed of the areas VPI0, VPI1 and VPI4 represented in FIG. 2B. In FIG. 2B the area of bits VPI4 has a length equal to the sum of the bit lengths of the areas VPI2 AND VPI3 of FIG. 2A. The field VCI used for switching in VC mode and which is represented in FIG. 3 is formed by the fields, VCI0, VCI1 AND VCI4.

Figure 4:
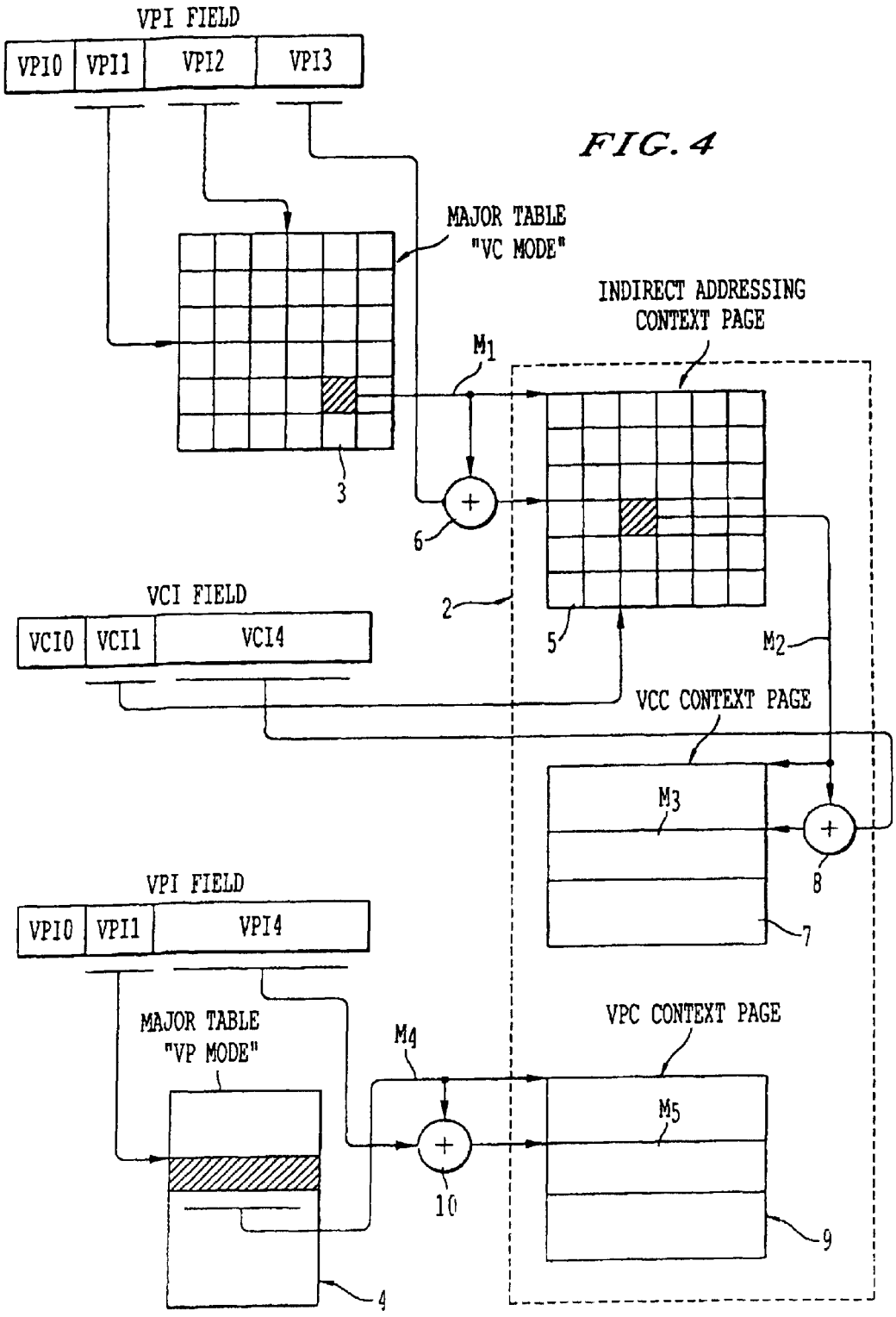
FIG. 4 a diagram illustrating the mode of addressing implemented by the invention in order to access contexts in the VP and VC switching modes.

The addressing of the context page on the basis of the major tables 3 and 4 takes place in accordance with the diagram of FIG. 4 in which the elements akin to those of FIG. 1 are represented with the same reference. For switching in VC mode the major table 3 is addressed by the high-order bits VPI1 and VPI2. The word found $M_1$ serves as a pointer to an indirect addressing context page 5 which catalogues the addresses of the context pages of the page block 2. In FIG. 4 the addresses of the context pages are situated at the crossovers between rows and columns. The address of a row is obtained by appending at 6 to the page pointer found in the major table 3, the content of the area VPI3 of the field VPI. The word $M_2$ which is thus found at the address indicated by the areas ($M_1$, VPI3, VCI1) is next used as a pointer to a context page VCC7. The sought-after context area $M_3$ is found inside the context page 7 by appending at 8 to the pointer $M_2$ the content of the area VCI4 of the field VCI. In VP switching mode, the address of the context page 9 is found by reading the word $M_4$ from the major table for indexing in VP mode at the address supplied by the area VPI1 of the field VPI. The sought-after context area $M_5$ is next found inside the context page 9 by appending at 10 the content of the word $M_4$ to the content of the area VPI4 of the field VPI.

According to one of the characteristics of the invention the size of the VPC and VCC contexts is constant and is determined by the relation $T_{VPC}=T_{VCC}=2^M$ where M is an integer which is independent of the sizes of pages. The size of an indirect addressing context is $T_{IND}=1$.

Denoting by Np0, Np1, Np2, Np3 and Np4 the numbers of bits making up the areas VPI0, VPI1, VPI2, VPI3 and VPI4 respectively of the field VPI and by Nc0, Nc1 and Nc4 the numbers of bits making up the areas VCI0, VCI1 and VCI4 respectively, the size of the context pages is defined as follows:

size of a VPC context page=$2^{Np4}$,$T_{VPC}$ size of a VCC context page=$2^{Nc4}$,$T_{VCC}$ size of a page of indirect addressing contexts=$2^{NP3}$,$2^{NC1}$, $T_{IND}$.

Since the size of the pages is constant the above relations make it possible to write $$Np4=Nc4=Nc1+Np3-M$$

Furthermore, the following relations exist:

$$Np0+Np1+Np2+Np3=P$$

$$Np2+Np3=Npy$$

$$Nc0+Nc1+Nc4=C=28-P$$

The sizes of the major tables have respective values $2^{Np1}$, $2^{Np2}$,$T_{IND}$ for the major table (VC mode) 3 and $2^{NP1}$,$T_{IND}$ for the major table (VP mode) 4.

Taking as parameters P=12, the following relations are obtained.

$$2Np1=Nc0-Np0+2P+M-20$$

$$2Nc1=Np0-Nc0-2P+M+36$$

$$2Np2=Np0-Nc0-2P-M+36$$

$$2Nc4=2Np4=20-M-Np0-Nc0$$

$$2Np3=2P-16-2Np0$$

By way of example, a dimensioning with M=5 may be as follows:

(Np0,Nc0)=(2,5) bits or (1,4) bits or (1,0) bits

Np1=0 or 1 or 4 or 5 bits depending on the number of active bits of the field VCI, and this gives:

a block of 255 pages, a major table for a VC switching of 64 words of 4 bytes, the size of an input being dependent on the chosen page size, a major table for a VP switching of 16 words of 4 bytes, the size of an input being dependent on the chosen page size, a single size of context of 8 words.

Figure 5:
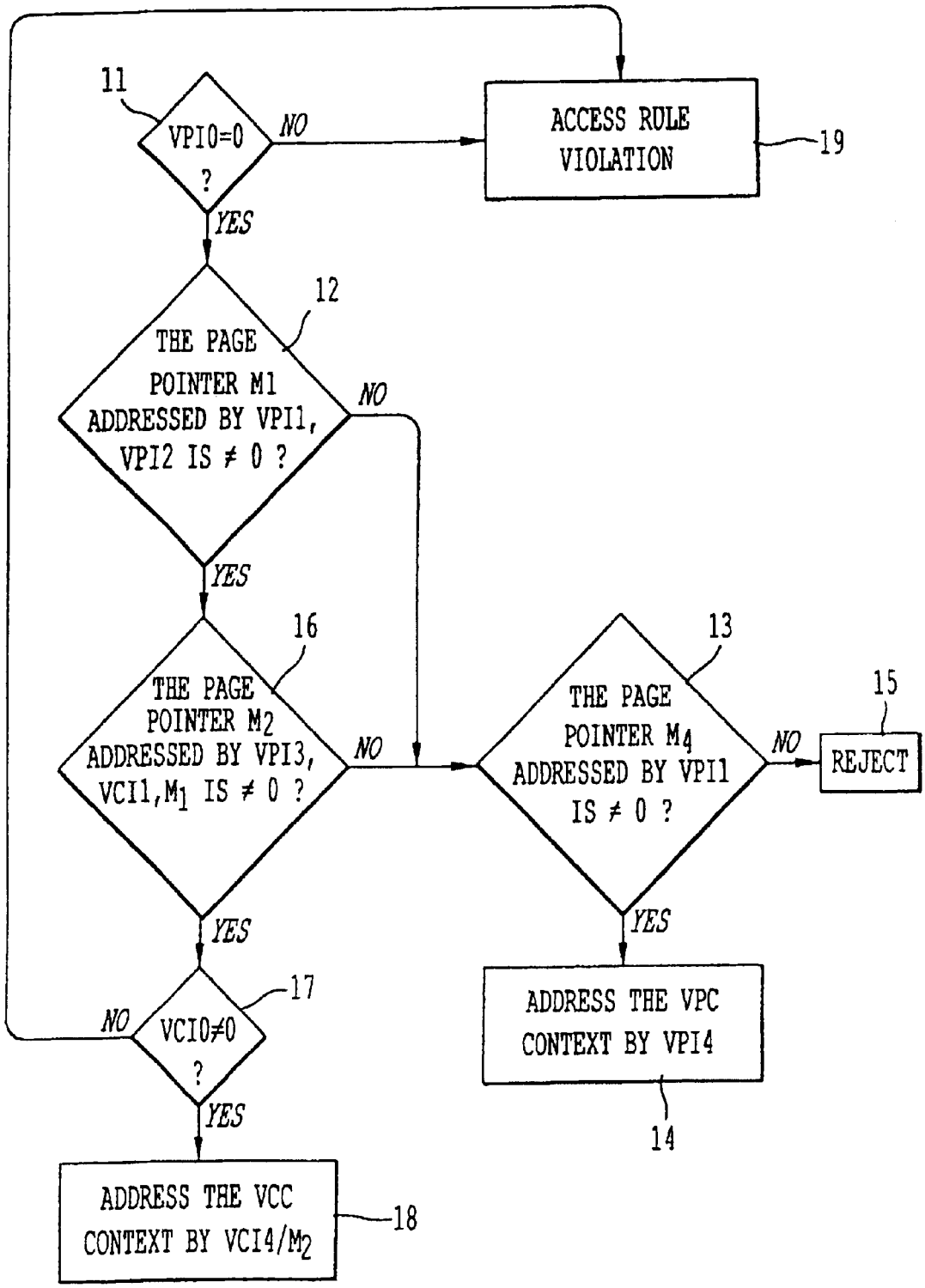
FIG. 5 a flow chart representing the sequencing of the various steps according to the invention of the process for addressing the translation memory so as to steer an incoming ATM cell inside a switch.

An algorithm for implementing the addressing process according to the invention is described below with the aid of steps 11 to 21 of the flow chart of FIG. 5.

In this flow chart the translation process commences at step 11 with a check of the validity of the virtual circuit identifier by extracting through logical intersection, for example, the bits of the area VPI0. If the identifier is not valid, the cell is rejected in step 19. If the identifier is validated, step 12 is executed in order to access, in the major table 3, the pointer $M_1$ of an indirect addressing page at the address indicated by the areas VPI1 and VPI2. If the pointer $M_1$ is null, the VP switching mode is selected by fetching in step 13 the word $M_4$ from the major table 4 at the address indicated by the area VPI1. If the content of the word $M_4$ is not null, a VP context is selected in step 14 from the context page $M_4$ of the VP switching mode, at the address indicated by the content of the field VPI4. In the case in which the word $M_4$ is null, the cell is rejected in step 15. If the test performed in step 12 indicates that the content of the pointer $M_1$ is not null, then a VC context page is selected in step 16 at the address indicated by the page pointer $M_2$ found inside the indirect addressing context 5 page $M_1$ at the address indicated by the fields VPI3 and VCI1. If $M_2$ is null, we return to the VP switching mode and we go to step 13. If $M_2$ is not null, a test is performed in step 17 on the content of the field VCI0. If the later is *not* null, a context is selected in step 18 from the VCC context page addressed by the pointer $M_2$ at the address indicated by the content of the field VCI4. If VCI0 is null, the cell is rejected in step 19. Upon the two cases of error which are identified in this flow chart (15 and 19), specific counters can be incremented. Furthermore, during steps 14 and 18, a check is carried out in the context reached to verify whether the VPC or the VCC concerned is active before performing the translation.

Variants to this process may be implemented for the addressing of pages, of 16, 32 and 128 contexts. By way of example, the addressing of pages with 16 contexts can take place by performing the following operations referenced from (a to k):

a) extract the 2 high-order bits of the field VPI and increment the violations counter if these bits are not null b) take the next 6 bits (VPI1) and address the VPI major table of the VC switching mode.

c) read the selected word d) take the next 2 bits (VPI2) and address (in the selected word) the byte designating the page of indirect addressing contexts;

e) if the page pointer is null, take the 6 bits from 10 to 4 (VPI1) and address the VPI major table of the VP mode,
read the selected VP page pointer
if this pointer is not null, the mode of switching is VP then go to the execution of k.
else reject the cell (increment a counter)

f) Else, take the next 2 bits (that is to say the last 2 bits of the VPI field) (VPI3) and select the indirect addressing context from the page.

g) take bits 11 to 5 of the VCI field (VCI1) and in the indirect addressing context address the pointer on the VC page.

h) if the pointer is not null (VC switching mode), check that there is no violation by comparing the first 5 bits of VCI (VCI0) with the null value. If there is violation, increment the violations counter and reject the cell, i) otherwise, select the VC context from the VC page on the basis of the 4 low-order bits of the VCI field (VCI4).
test the activity indicator of this VC context before using the information of this context. If the indicator is inactive, reject the cell (increment a counter).

j) If this pointer is null, 2 cases may arise: VP mode of switching or VC context inactive in the VC switching mode:
take the 6 bits from 10 to 4 (VPI1) and address the VPI major table of the mode VP of switching in fast memory
read the selected VP page pointer
if this pointer is not null, the case is a VP switching mode (then go to k)
else the case is a VC switching mode with VCC inactive: reject the cell (increment a counter)

k) VP mode of switching
take the last 4 bits of the VPI field (VPI4) and select the VP context from the selected VP page
test the activity indicator of this VP context before using the information of this context.

If the indicator is inactive, reject the cell (increment a counter).

Similar operations can be executed for the addressing of pages with 32 and 128 contexts.

What is claimed is:

1. Process for translating an ATM cell header for the routing thereof on a transmission highway of a communication network via an ATM switch, the header of the cell comprising a first field VPI and a second field VCI, [the first field VPI and a second field VCI,] the first field VPI identifying a virtual path (VP) number and the second field VCI selecting a specified virtual channel (VC) within the virtual path, said process comprising:

storing indirect addressing context page numbers for virtual circuits in VC switching mode in a first major table, storing context page numbers for virtual circuits in VP switching mode in a second major table, storing context page numbers for virtual circuits in VC switching mode in indirect addressing context pages, addressing the context pages of virtual circuits in VC switching mode by way of an indirect addressing context page on the basis of the first major table and of the field VCI, and addressing the context pages of the VP switching mode on the basis of context page numbers contained in the second major table, wherein all context pages have a substantially identical size.

2. Process according to claim 1, characterized in that for the addressing of a context page in VC switching mode, the first field VPI comprises a first area of bits VPI1 and a second area of bits VPI2, which areas are reserved for the addressing of the first major table (3) for switching in VC mode, and a third area of bits VPI3 which is reserved for the addressing of an indirect addressing context page (5) and in that the second field [VPI] *VCI* comprises a first area of bits VCI1 which is reserved together with the third area of bits VPI3 for addressing inside the indirect addressing context pages as well as a second area of bits VCI4.

3. Process according to claim 2, characterized in that it consists in also using, for the addressing of a context page in VP switching mode, the first area of bits VPI1 for the addressing of words inside the second major table (4) for switching in VP mode and a second area of bits VPI4 which is reserved as indirect addressing word for the addressing of a context inside a context page.

4. The process of claim 1, wherein a size of the VP mode context page and the VC mode context page is constant and is determined by $$T_{VPC}=T_{VCC}=2^M$$

where $T_{VPC}$ is the size of the VP mode context pages, where $T_{VCC}$ is the size of the VC mode context pages, and M is an integer that is independent of the size of the VP mode and VC mode context pages.

5. The process of claim 2, wherein a size of the VP mode context page and the VC mode context page is constant and is determined by $$T_{VPC}=T_{VCC}=2^M$$

where $T_{VPC}$ is the size of the VP mode context pages, where $T_{VCC}$ is the size of the VC mode context pages, and M is an integer that is independent of the size of the VP mode and VC mode context pages.

6. The process of claim 3, wherein a size of the VP mode context page and the VC mode context page is constant and is determined by $$T_{VPC}=T_{VCC}=2^M$$

where $T_{VPC}$ is the size of the VP mode context pages, where $T_{VCC}$ is the size of the VC mode context pages, and M is an integer that is independent of the size of the VP mode and VC mode context pages.

7. A digital data switch for translating and routing an asynchronous transfer mode (ATM) cell having a header that includes a VPI field identifying a virtual path number, and a VCI field identifying a virtual channel within the virtual path, said switch comprising:

a first major table configured to store indexation fields relative to virtual channel (VC) mode circuits;

a second major table configured to store indexation fields relative to virtual path (VP) mode circuits; and a general purpose page block configured to store an indirect addressing context page configured to catalog and address VC mode and VP mode context pages stored in the general purpose page block, wherein, in a VC switching mode, the VC context pages are addressed by way of the indirect addressing context page on the basis of the first major table and the VCI field, wherein, in a VP switching mode, the VP context pages are addressed on the basis of context page numbers contained in the second major table; and wherein all context pages have a substantially identical size.

8. The switch of claim 7, wherein a size of the VP mode context page and the VC mode context page is constant and is determined by $$T_{VPC}=T_{VCC}=2^M$$

where $T_{VPC}$ is the size of the VP mode context pages, where $T_{VCC}$ is the size of the VC mode context pages, and M is an integer that is independent of the size of the VP mode and VC mode context pages.

9. A digital data switch for translating and routing an asynchronous transfer mode (ATM) cell having a header that includes a VPI field identifying a virtual path number, and a VCI field identifying a virtual channel number within the virtual path, said switch comprising:

means for storing indexation fields relative to virtual channel (VC) mode circuits;

means for storing indexation fields relative to virtual path (VP) mode circuits; and means for cataloging and addressing VC mode and VP mode context pages stored in a general purpose page block, wherein, in a VC switching mode, the VC context pages are addressed by way of the means for cataloging and addressing on the basis of the means for storing indexation fields relative to virtual channel (VC) mode circuits and the VCI field, wherein, in a VP switching mode, the VP context pages are addressed on the basis of context page numbers contained in the means for storing indexation fields relative to virtual path (VP) mode circuits; and wherein all context pages have a substantially identical size.

*10. A computer-readable medium for use in translating and routing an asynchronous transfer mode (ATM) cell, the cell having a header that includes a virtual path identification field (VPI) field and a virtual channel identification (VCI) field, the computer-readable medium comprising:*

*a first table configured to store data for identifying one or more indirect addressing context pages;*

*a virtual channel context page configured to store a context area M3; and*

*an indirect addressing context page configured to store an address M2 to identify the virtual channel context page,*

*wherein, in a virtual channel mode, the first table is used to locate a pointer M1 by using portions of the VPI field; the indirect addressing context page is located by using the pointer M1; the address M2 is located by using the pointer M1, a portion of the VPI field, and a portion of the VCI field; and the context area M3 is located by using the address M2 and a portion of the VCI field.*

*11. The computer-readable medium of claim 10, wherein the pointer M1 in the first table for switching in the virtual channel mode is located by using a first portion of the VPI field (VPI1) and a second portion of the VPI field (VPI2).*

*12. The computer-readable medium of claim 11, wherein the pointer M1 is located at a cross section between a row and a column, the row identified by VPI1 and the column identified by VPI2.*

*13. The computer-readable medium of claim 11, wherein the indirect addressing context page is found by the pointer M1 acting as a pointer to a location in a block of context pages where the indirect addressing context page resides, the indirect addressing context page cataloging addresses of context pages in the block of context pages.*

*14. The computer-readable medium of claim 13, wherein the address M2 of the virtual channel context page is located by using the pointer M1, a third portion of the VPI field (VPI3), and a first portion of the VCI field (VCI1).*

*15. The computer-readable medium of claim 14, wherein the address M2 is located at a cross section between a row and a column in the indirect addressing page found by the pointer M1, the row being determined by appending to the pointer M1 the content of the third portion of the VPI field (VPI3), the column being determined by the first portion of the VCI field (VCI1).*

*16. The computer-readable medium of claim 14, wherein the context area M3 of the virtual channel context page is located by using the address M2 and a second portion of the VCI field (VCI4).*

*17. The computer-readable medium of claim 16, wherein the context area M3 is located by appending the content of VCI4 to the address M2.*

*18. The computer-readable medium of claim 16 further comprising:*

*a second table configured to store data for identifying one or more virtual path context pages; and*

*a virtual path context page configured to store a context area M5;*

*wherein, in a virtual path mode, the second table contains an address M4 that is located by using a portion of the VPI field; the virtual path context page is located using the address M4; and the context area M5 is located by using the address M4 and another portion of the VPI field.*

*19. The computer-readable medium of claim 18, wherein the address M4 in the second table for switching in the virtual path mode is located by using the first portion of the VPI field (VPI1).*

*20. The computer-readable medium of claim 19, wherein the context area M5 is located by using the address M4 and a fourth portion of the VPI field (VPI4).*

*21. The computer-readable medium of claim 20, wherein the virtual path identification, in the virtual channel mode, is formed from portions VPI0, VPI1, VPI2, and VPI3, and wherein the virtual path identification, in the virtual path mode, is formed from portions VPI0, VPI1, and VPI4, the bit length of the portion VPI4 being equivalent to the sum of the bit lengths of the portions VPI2 and VPI3, wherein the virtual channel identifier is formed from portions VCI0, VCI1, and VCI4.*

*22. The computer-readable medium of claim 18, wherein a size of the virtual path context pages and the virtual channel context pages is constant.*

*23. The computer-readable medium of claim 18, wherein all the context pages have a substantially similar size.*

*24. The computer-readable medium of claim 10, wherein all the context pages have a substantially similar size.*

*25. The computer-readable medium of claim 10, wherein the size of one of the context pages is substantially similar to the size of another of the context pages.*

*26. The computer-readable medium of claim 25, wherein the pointer M1 in the first table for switching in the virtual channel mode is located by using a first portion of the VPI field (VPI1) and a second portion of the VPI field (VPI2).*

*27. The computer-readable medium of claim 26, wherein the pointer M1 is located at a cross section between a row and a column, the row identified by VPI1 and the column identified by VPI2.*

*28. The computer-readable medium of claim 26, wherein the indirect addressing context page is found by the pointer M1 acting as a pointer to a location in a block of context pages where the indirect addressing context page resides, the indirect addressing context page cataloging addresses of context pages in the block of context pages.*

*29. The computer-readable medium of claim 28, wherein the address M2 of the virtual channel context page is located by using the pointer M1, a third portion of the VPI field (VPI3), and a first portion of the VCI field (VCI1).*

*30. The computer-readable medium of claim 29, wherein the address M2 is located at a cross section between a row and a column in the indirect addressing page found by the pointer M1, the row being determined by appending to the pointer M1 the content of the third portion of the VPI field (VPI3), the column being determined by the first portion of the VCI field (VCI1).*

*31. The computer-readable medium of claim 29, wherein the context area M3 of the virtual channel context page is located by using the address M2 and a second portion of the VCI field (VCI4).*

*32. The computer-readable medium of claim 31, wherein the context area M3 is located by appending the content of VCI4 to the address M2.*

*33. The computer-readable medium of claim 31 further comprising:*

*a second table configured to store data for identifying one or more virtual path context pages; and*

*a virtual path context page configured to store a context area M5;*

*wherein, in a virtual path mode, the second table contains an address M4 that is located by using a portion of the VPI field; the virtual path context page is located using the address M4; and the context area M5 is located by using the address M4 and another portion of the VPI field.*

*34. The computer-readable medium of claim 33, wherein the address M4 in the second table for switching in the virtual path mode is located by using the first portion of the VPI field (VPI1).*

*35. The computer-readable medium of claim 34, wherein the context area M5 is located by using the address M4 and a fourth portion of the VPI field (VPI4).*

*36. A computer-readable medium for use in translating and routing an asynchronous transfer mode (ATM) cell, the cell having a header that includes a virtual path identification field (VPI) field and a virtual channel identification (VCI) field, the computer-readable medium comprising:*

*a virtual channel context page configured to store a first context area that is found in a VC switching mode by appending a first portion of the VCI field (VCI4) to a first address that is found from an indirect addressing context page, wherein data of the first context area is used to translate the ATM cell in a VC switching mode; and*

*a virtual path context page configured to store a second context area that is found in a VP switching mode by appending a first portion of the VPI field (VPI4) to a second address that is found by using a second portion of the VPI field (VPI1) to index into a first table, wherein data of the second context area is used to translate the ATM cell in a VP switching mode.*

*37. The computer-readable medium of claim 36, wherein the size of the virtual channel context page and the size of the virtual path context page are constant.*

*38. The computer-readable medium of claim 36, wherein the size of the virtual channel context page is equivalent to the product of 2 raised to the power of M and 2 raised to the power of Np4, M being an integer which is independent of the size of the virtual channel context page and the size of the virtual path context page, Np4 being the number of bits associated with a portion of the virtual path identification (VPI4).*

*39. The computer-readable medium of claim 38, wherein the size of the virtual channel context page is equivalent to the product of 2 raised to the power of M and 2 raised to the power of Nc4, Nc4 being the number of bits associated with a portion of the virtual channel identification (VCI4).*

*40. The computer-readable medium of claim 39, wherein the size of an indirect addressing context page is equivalent*

*to the product of 2 raised to the power of Np3 and 2 raised to the power of Nc1, Np3 being the number of bits associated with a portion of the virtual path identification (VPI3), Nc1 being the number of bits associated with a portion of the virtual channel identification (VCI1).*

*41. The computer-readable medium of claim 40, wherein the size of a table for facilitating the virtual channel mode is equivalent to the product of 2 raised to the power of Np1 and 2 raised to the power of Np2, Np1 being the number of bits associated with a portion of the virtual path identification (VPI1), Np2 being the number of bits associated with a portion of the virtual path identification (VPI2).*

*42. The computer-readable medium of claim 40, wherein the size of a table for facilitating the virtual path mode is equivalent to 2 raised to the power of Np1, Np1 being the number of bits associated with a portion of the virtual path identification (VPI1).*

*43. The computer-readable medium of claim 36, wherein, in the VC switching mode, the indirect addressing context page is located by using portions VPI1 and VPI2 of the VPI field to index into a second table.*

*44. The computer-readable medium of claim 43, wherein the size of the virtual channel context page and the size of the virtual path context page are constant.*

*45. The computer-readable medium of claim 43, wherein the size of one of the context pages is substantially similar to the size of another of the context pages.*

*46. A method for translating an ATM cell header for the routing thereof on a transmission highway of a communication network via an ATM switch, the header of the cell comprising a first field VPI and a second field VCI, the first field VPI identifying a virtual path (VP) number and the second field VCI selecting a specified virtual channel (VC) within the virtual path, said process comprising:*

*storing indirect addressing context page numbers for virtual circuits in VC switching mode in a first major table,*

*storing context page numbers for virtual circuits in VP switching mode in a second major table,*

*storing context page numbers for virtual circuits in VC switching mode in indirect addressing context pages,*

*addressing the context pages of virtual circuits in VC switching mode by way of an indirect addressing context page on the basis of the first major table and of the field VCI, and*

*addressing the context pages of the VP switching mode on the basis of context page numbers contained in the second major table, wherein the size of one of the context pages is substantially similar to the size of another of the context pages.*

*47. The method of claim 46, characterized in that for the addressing of a context page in VC switching mode, the first field VPI comprises a first area of bits VPI1 and a second area of bits VPI2, which areas are reserved for the addressing of the first major table (3) for switching in VC mode, and a third area of bits VPI3 which is reserved for the addressing of an indirect addressing context page (5) and in that the second field VPI comprises a first area of bits VCI1 which is reserved together with the third area of bits VPI3 for addressing inside the indirect addressing context pages as well as a second area of bits VCI4.*

*48. The method of claim 47, characterized in that it consists in also using, for the addressing of a context page in VP switching mode, the first area of bits VPI1 for the addressing of words inside the second major table (4) for switching in VP mode and a second area of bits VPI4 which is reserved as indirect addressing word for the addressing of a context inside a context page.*

*49. A digital data switch for translating and routing an asynchronous transfer mode (ATM) cell having a header that includes a VPI field identifying a virtual path number and a VCI field identifying a virtual channel within the virtual path, said switch comprising:*

*a first major table configured to store indexation fields relative to virtual channel (VC) mode circuits;*

*a second major table configured to store indexation fields relative to virtual path (VP) mode circuits; and*

*a general purpose page block to store an indirect addressing context page configured to catalog and address VC mode context pages stored in the general purpose page block,*

*wherein, in a VC switching mode, the VC context pages are addressed by way of the indirect addressing context page on the basis of the first major table and the VCI field,*

*wherein, in a VP switching mode, VP context pages are addressed on the basis of context page numbers contained in the second major table, and*

*wherein the size of one of the context pages is substantially similar to the size of another of the context pages.*

*50. The switch of claim 49, wherein a VC switching mode, the first field VPI comprises a first area of bits VPI1 and a second area of bits VPI2, which areas are reserved for the addressing of the first major table for switching in VC mode, and a third area of bits VPI3 which is reserved for the addressing of an indirect addressing context page; and the second field VCI comprises a first area of bits VCI1 which is reserved together with the third area of bits VPI3 for addressing inside the indirect addressing context pages as well as a second area of bits VCI4.*

*51. The switch of claim 50, wherein in a VP switching mode, the first area of bits VPI1 is reserved for the addressing of words inside the second major table for switching in VP mode and the second area of bits VPI4 is reserved as an indirect addressing word for the addressing of a context inside a context page.*

*52. A digital data switch for translating and routing an asynchronous transfer mode (ATM) cell having a header that includes a VPI field identifying a virtual path number and a VCI field identifying a virtual channel within the virtual path, said switch comprising:*

*means for storing indexation fields relative to virtual channel (VC) mode circuits;*

*means for storing indexation fields relative to virtual path (VP) mode circuits; and*

*means for cataloging and addressing VC mode context pages stored in the general purpose page block,*

*wherein, in a VC switching mode, the VC context pages are addressed by way of the means for cataloging and addressing on the basis of the means for storing indexation fields relative to virtual channel (VC) mode circuits and the VCI field,*

*wherein, in a VP switching mode, VP context pages are addressed on the basis of context page numbers contained in the means for storing indexation fields relative to virtual path (VP) mode circuits, and*

*wherein the size of one of the context pages is substantially similar to the size of another of the context pages.*

*53. The switch of claim 52, wherein in a VC switching mode, the first field VPI comprises a first area of bits VPI1 and a second area of bits VPI2, which areas are reserved for the addressing of the means for storing indexation fields relative to virtual channel (VC) mode circuits, and a third*

*area of bits VPI3 which is reserved for the addressing of the means for cataloging and addressing VC mode context pages stored in the general purpose page block; and the second field VCI comprises a first area of bits VCI1 which is reserved together with the third area of bits VPI3 for addressing inside the means for cataloging and addressing VC mode context pages stored in the general purpose page block as well as a second area of bits VCI4.*

*54. The switch of claim 53, wherein in a VP switching mode, the first area of bits VPI1 is reserved for the addressing of words inside the means for storing indexation fields relative to virtual path (VP) mode circuits and the second area of bits VPI4 is reserved as an indirect addressing word for the addressing of a context inside a context page.*

*55. A computer-readable medium for use in translating and routing an asynchronous transfer mode (ATM) cell having a header that includes a VPI field identifying a virtual path number and a VCI field identifying a virtual channel number within the virtual path, said computer-readable medium comprising:*

*a first major table configured to store indexation fields relative to virtual channel (VC) mode circuits;*

*a second major table configured to store indexation fields relative to virtual path (VP) mode circuits; and*

*a general purpose page block to store an indirect addressing context page configured to catalog and address VC mode context pages stored in the general purpose page block,*

*wherein, in a VC switching mode, the VC context pages are addressed by way of the indirect addressing context page on the basis of the first major table and the VCI field,*

*wherein, in a VP switching mode, VP context pages are addressed on the basis of context page numbers contained in the second major table, and*

*wherein the size of one of the context pages is substantially similar to the size of another of the context pages.*

*56. The computer-readable medium of claim 55, wherein in a VC switching mode, the first field VPI comprises a first area of bits VPI1 and a second area of bits VPI2, which areas are reserved for the addressing of the first major table for switching in VC mode, and a third area of bits VPI3 which is reserved for the addressing of an indirect addressing context page; and the second field VCI comprises a first area of bits VCI1 which is reserved together with the third area of bits VPI3 for addressing inside the indirect addressing context pages as well as a second area of bits VCI4.*

*57. The computer-readable medium of claim 56, wherein in a VP switching mode, the first area of bits VPI1 is reserved for the addressing of words inside the second major table for switching in VP mode and the second area of bits VPI4 is reserved as an indirect addressing word for the addressing of a context inside a context page.*

* * * * *

UNITED STATES PATENT AND TRADEMARK OFFICE

CERTIFICATE OF CORRECTION

PATENT NO. : RE 40,776 E
APPLICATION NO. : 11/119494
DATED : June 23, 2009
INVENTOR(S) : Delattre et al.

It is certified that error appears in the above-identified patent and that said Letters Patent is hereby corrected as shown below:

| COLUMN | LINE | ERROR |
|---|---|---|
| Title page Item (57) Pg. 1, col. 2 | line 7 of text | after "includes" delete --in]-- |
| Col. 11 | 66 | before "indirect" insert --an-- |
| Col. 12 | 24 | after "wherein" insert --in-- |

Signed and Sealed this

Sixth Day of April, 2010

David J. Kappos

David J. Kappos
*Director of the United States Patent and Trademark Office*